United States Patent [19]

Rossmann et al.

[11] Patent Number: 5,243,788
[45] Date of Patent: Sep. 14, 1993

[54] GRINDING WHEEL BALANCING METHOD AND APPARATUS

[75] Inventors: Günther Rossmann, Lautertal; Jesus Varona; Andreas Hofmann, both of Darmstadt, all of Fed. Rep. of Germany

[73] Assignee: Gebr. Hofmann GmbH & Co., KG Maschinenfabrik, Pfungstadt, Fed. Rep. of Germany

[21] Appl. No.: 567,896

[22] Filed: Aug. 15, 1990

[30] Foreign Application Priority Data

Sep. 11, 1989 [DE] Fed. Rep. of Germany ....... 3930299

[51] Int. Cl.$^5$ .................... G01M 1/38; B24B 45/00
[52] U.S. Cl. .................................... 51/169; 73/462
[58] Field of Search ....................... 51/169; 73/462

[56] References Cited

U.S. PATENT DOCUMENTS

| | | | |
|---|---|---|---|
| 2,958,165 | 11/1960 | Hofmann | 51/169 |
| 3,332,174 | 7/1967 | Behm | 51/169 |
| 4,345,472 | 8/1982 | Hara et al. | 73/462 |
| 4,357,832 | 11/1982 | Blackburn | 73/462 |

FOREIGN PATENT DOCUMENTS

| | | |
|---|---|---|
| 2830070 | 1/1980 | Fed. Rep. of Germany . |
| 3003127 | 7/1981 | Fed. Rep. of Germany . |
| 3614379 | 5/1987 | Fed. Rep. of Germany . |
| 3726024 | 2/1989 | Fed. Rep. of Germany . |
| 0004567 | 1/1987 | Japan ............... 51/169 |
| 0221971 | 9/1988 | Japan ............... 51/169 |
| 0289660 | 11/1989 | Japan ............... 51/169 |
| 0124264 | 5/1990 | Japan ............... 51/169 |
| 0726454 | 4/1980 | U.S.S.R. ............ 51/169 |
| 0729458 | 4/1980 | U.S.S.R. ............ 51/169 |

OTHER PUBLICATIONS

Patent Abstracts of Japan Jul. 1990; vol. 14, No. 349 (P-1084) (4292) (in German text).

*Primary Examiner*—Roscoe V. Parker
*Attorney, Agent, or Firm*—Cushman, Darby & Cushman

[57] ABSTRACT

In a method and an apparatus for balancing a grinding wheel, balancing weights on the grinding wheel remain secured to the grinding wheel in an unbalance measuring operation, and the positions at which the balancing weights are secured to the grinding wheel are stored. In a repositioning operation for compensating for measured unbalance of the grinding wheel, the influences of the forces of the balancing weights during the unbalance measuring operation are derived from the stored positions of the weights and compensated for so as to balance the ginding wheel.

14 Claims, 4 Drawing Sheets

GRINDING WHEEL BALANCING METHOD AND APPARATUS

BACKGROUND OF THE INVENTION

It is generally recognised that unbalance of a grinding wheel can give rise to serious problems in regard to the operational performance thereof. In that connection it will be observed that unbalance of a grinding wheel primarily arises due to geometrical differences, an eccentric mounting for the grinding wheel, uneven abrasion of the grinding wheel in the course of use thereof, trimming and dressing of the grinding wheel, and differences in the absorption of coolant water as a result of the grinding wheel being of a non-homogeneous structure. When the grinding wheel rotates, such unbalance factors give rise to mass acceleration forces which have an effect on the structure of the grinding machine on which the grinding wheel is fitted. That in turn results in relative movements, caused by the unbalance of the grinding wheel, as between the workpiece being ground and the grinding wheel which is performing the grinding operation, and the relative movements can in turn result in the ground surfaces on the workpiece being machined suffering from surfaces rippling or even chatter marks. Balanced grinding wheels are therefore necessary in order to produce accurate surface profiles on the workpieces to be machined thereby.

For the purposes of balancing grinding wheels, two or three balancing weights in the form of slidable balancing weights may be arranged on the grinding wheel in a guide groove which extends around the axis of the grinding wheel, the balancing weights being disposed in dependence on the unbalance from which the grinding wheel is suffering. Reference may be made in that respect for example to Hofmann Informationen 12, special edition: Balancing of grinding wheels. In use of such an arrangement, the unbalance of the grinding wheel is measured by means of a measuring detector which is mounted on the grinding machine and to which an unbalance measuring device is connected. The unbalance measuring device is set to the speed of rotation of the grinding wheel so that essentially only oscillations which are at the same frequency as the rotating grinding wheel are displayed. The unbalance of the grinding wheel is then ascertained from the detected oscillations.

In effecting that procedure, the balancing weights have to be removed from the grinding wheel in order to measure the unbalance thereof, so as to ascertain the actual unbalance of the grinding wheel during the measuring operation. The balancing weights are then re-fitted to the grinding wheel, in dependence on the measured unbalance thereof. The operation of removing and refitting the balancing weights involves a relatively large amount of time and involves highly accurate operation in order the balancing weights to be secured to the grinding wheel in the correct positions thereon in order to compenstate for the grinding wheel unbalance.

SUMMARY OF THE INVENTION

An object of the present invention is to provide a method of compensating for unbalance of a grinding wheel, which involves a reduced amount of time for effecting the balancing operation.

Another object of the present invention is to provide a grinding wheel balancing method which involves a rapid and rational procedure for effecting balancing, without involving ancillary operations which do not contribute directly to achieving a balanced condition for the grinding wheel.

Still another object of the present invention is to provide an apparatus of a simple but reliable configuration for balancing a grinding wheel quickly.

Still another object of the present invention is to provide a grinding wheel balancing apparatus which is highly versatile in use thereof in relation to balancing operations.

In accordance with the principles of the present invention, in a first aspect, these and other objects are achieved by a method of balancing a grinding wheel wherein, after an operation of measuring unbalance of the grinding wheel, to compensate for the measured unbalance, two or more balancing weights are secured to the grinding wheel on one or more radii around the axis of the grinding wheel in balancing positions which are calculated from the measured unbalance. In the unbalance measuring operation, the balancing weights remain secured to the grinding wheel and the positions in which the balancing weights are secured to the grinding wheel are stored. When re-positioning the balancing weights on the grinding wheel to provide for compensation for the measured unbalance thereof, the influences of forces exerted by the balancing weights are compensated.

When the balancing procedure involved in balancing a grinding wheel includes using first and second balancing weights, the balancing weights are arranged at respective sides of an angular position on the grinding wheel, which position is turned through 180° relative to the detected angular position of the unbalance. When, on the other hand, the procedure involves the use of three balancing weights, one thereof is arranged in particular at an angular position which is turned through 180° relative to the detected angular position of the unbalance, while the other two balancing weights are disposed at respective sides of the angular position of the first balancing weight. When using balancing weights which are not of the same weight, the detected unbalance can also be divided into components to provide a balancing effect by means of the available balancing weights.

In a preferred embodiment of the method of the invention, in order to compensate for the influences of forces of the balancing weights during the unbalance measuring operation, the procedure involves ascertaining the force vectors which arise out of the stored positions, that is to say the respective radii and angular positions and the respective masses of the balancing weights which have remained on the grinding wheel. Force vectors which are opposite to those ascertained force vectors and which are unbalance vectors compensated by the balancing weights used, which have remained on the grinding wheel, are vectorially added to the measured unbalance vector. The resulting unbalance vector is the actual grinding wheel unbalance vector which is then compensated by re-positioning the balancing weights on the grinding wheel, that is to say at the appropriate radii and angular positions. For that purpose the balancing weights may be movable on variable radii about the axis of rotation of the grinding wheel. It is also possible for the balancing weights to be movable on constant radii about the axis of rotation of the grinding wheel. It is further possible for the balancing weights to be movably guided on a common radius about the axis of rotation of the grinding wheel.

The lowest level of expenditure and a high quality of balancing effect, in particular when dealing with slight degrees of unbalance, are achieved if the balancing weights are each of the same mass and the balancing weights are movably disposed on a common radius about the axis of the grinding wheel, to provide for appropriate positioning of the balancing weights.

In accordance with the invention in a further aspect, the foregoing and other objects are achieved by an apparatus for balancing a grinding wheel comprising a measurement value detector and an unbalance measuring device connected thereto, with an evaluation means for determining in dependence on the measured unbalance the positioning of two balancing weights carried on the grinding wheel. Associated with each of the balancing weights is a respective vector storage means for storing, in dependence on the mass and positioning of the respective balancing weights on the grinding wheel, an unbalance vector which is compensated thereby. Connected to the vector storage means is a vector adding means which in turn is connected to the output of the unbalance measuring means and which receives a signal corresponding to the measured unbalance. Connected to the vector adding means is a 180°-circuit which turns through 180° the direction of the vector formed by the vector adding means and supplies a corresponding signal. One output of the 180°-circuit is connected to an input of an angle adding means which receives from a first angle calculating means a signal corresponding to a first angle, wherein the first angle calculating means calculates said first angle from the absolute value of the output signal supplied by the vector adding means and a scalar value which is formed from the mass of the one balancing weight and the radius on which said one balancing weight is disposed on the grinding wheel movably about the axis of rotation thereof. The other output of the 180°-circuit is connected to an angle subtracting means which receives from a second angle calculating means a signal corresponding to a second angle, wherein the second angle calculating means calculates said second angle from the absolute value of the output signal supplied by the vector adding means and a second scalar value which is formed from the mass of the other balancing weight and the radius on which said other balancing weight is carried on the grinding wheel movably about the axis of rotation thereof.

In accordance with a further aspect an apparatus for balancing a grinding wheel installed in a grinding machine comprises a measurement value detector and an unbalance measuring device connected thereto, together with an evaluation means for determining in dependence on the measured unbalance the positioning of first, second and third balancing weights which can be moved on and secured to the grinding wheel. Associated with each of the first, second and third balancing a respective vector storage means for storing, in dependence on the mass and positioning of the respective balancing weight on the grinding wheel, an unbalance vector which is compensated thereby, while connected to the plurality of vector storage means is a vector adding means connected to the output of the unbalance measuring device. Connected to the vector adding means is a 180°-circuit which turns thorugh 180° the direction of the vector formed by the vector adding means, and supplies a corresponding angle signal. That signal represents the angular position for positioning of one of the balancing weights. Connected to the output of the vector adding means is an absolute value calculating means for forming a scalar value of the vector supplied by the vector adding means while connected to the absolute value calculating means is a subtracting means for calculating the difference of the scalar value of the vector supplied by the vector adding means and a second scalar value which is formed from the mass of the balancing weight to be arranged at the above-mentioned angular position and the radius on which the balancing weight is carried on the grinding wheel about the axis of rotation thereof. One input of the 180°-circuit is connected to an input of an angle adding means which receives from a first angle calculating means connected to the subtracting means, an angle signal corresponding to the cosine value formed, said angle signal being calculated from the scalar values which are passed to the first angle calculating means and which are formed from the masses of the other two balancing weights and the radii on which they are disposed around the axis of rotation of the grinding wheel. The other output of the 180°-circuit is connected to an input of an angle subtracting means which receives from a second angle calculating means connected to the subtracting means, an angle signal corresponding to the cosine value formed, said angle signal being calculated from a scalar value which is passed to the second angle calcualting means and which is formed from the mass of the other of the two remaining balancing weights and the radius on which that balancing weight is disposed around the axis of rotation of the grinding wheel.

The apparatus in accordance with the principles of the invention for balancing a grinding wheel thus comprises an evaluation means which is connected to the unbalance measuring device. Vector storage means associated with the respective balancing weights are provided in the evaluation means and the vector storage means store, in dependence on the respective masses, radii and angular positions of the balancing weights which remain on the grinding wheel during an unbalance measuring run, the unbalance vectors which are balanced thereby. Connected to the vector storage means is a vector adding means which is further connected to the output side of the unbalance measuring device and receives a signal corresponding to the measured unbalance therefrom. In a measuring run in which the grinding wheel rotates at a given measuring speed of rotation, the force vectors which in that situation are compensated by the balancing weights fixed on the grinding wheel and the unbalance measuring signal supplied by the unbalance measuring device are added in the vector adding means. In dependence on the vector which is ascertained in that way and which is the unbalance vector of just the grinding wheel without balancing weights, balancing of the grinding wheel is then effected by suitable re-positioning of the balancing weights.

The method and apparatus according to the invention can be used not just for static balancing in one plane but also for dynamic balancing in two or more planes, in which case the appropriate unbalance measuring and unbalance compensating procedure is then carried out in each of the respective planes involved. It will be appreciated that as the balancing weights can remain on the grinding wheel during the unbalance measuring run, the teaching of the invention provides for a considerable saving of time when balancing a grinding wheel.

Further objects, features and advantages of the present invention will be apparent from the following description of preferred embodiments.

DESCRIPTION OF THE PREFERRED EMBODIMENTS

Figure 1:
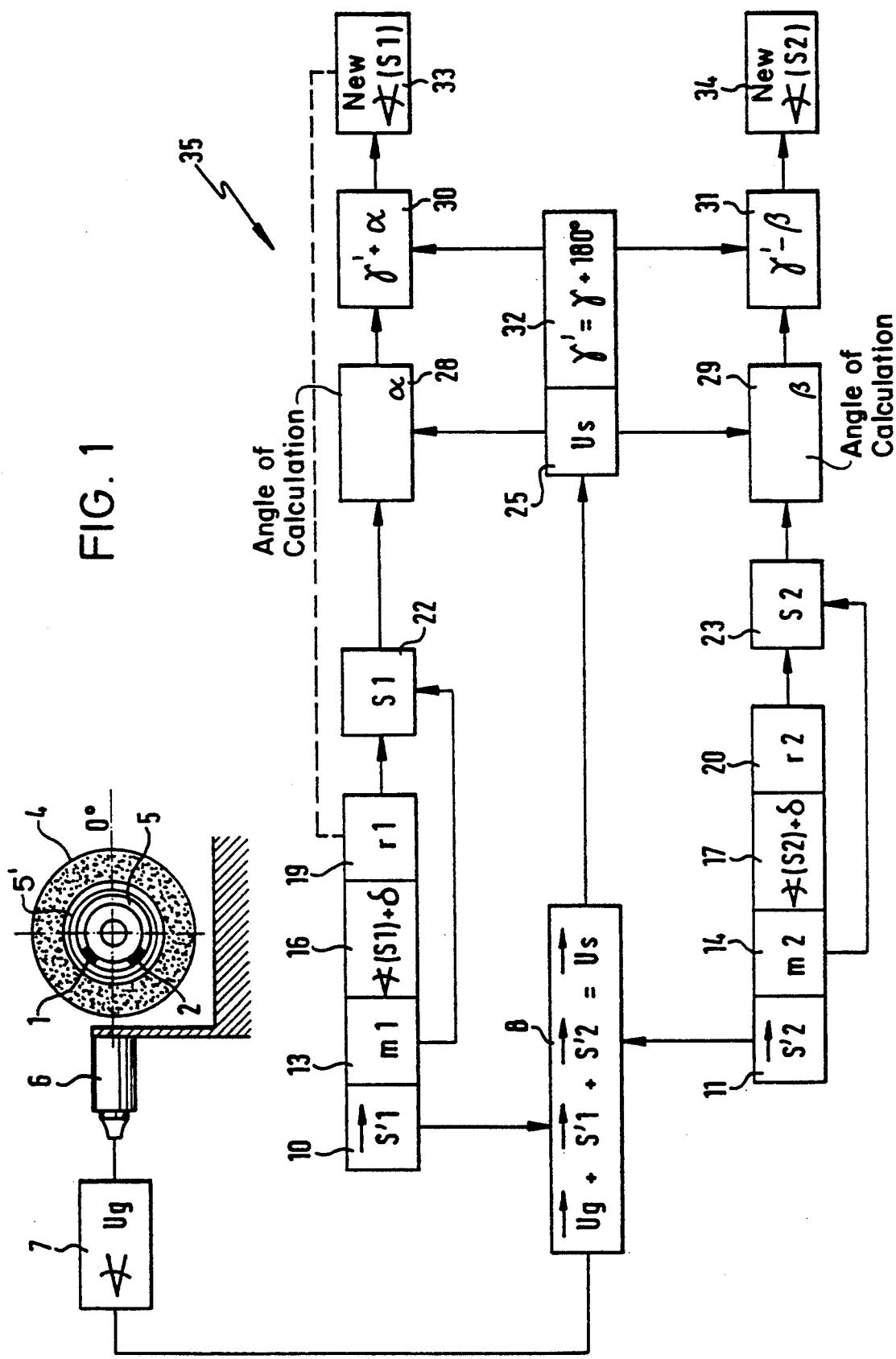
FIG. 1 is a block circuit diagram of a first embodiment of an apparatus according to the invention.
Figure 2:
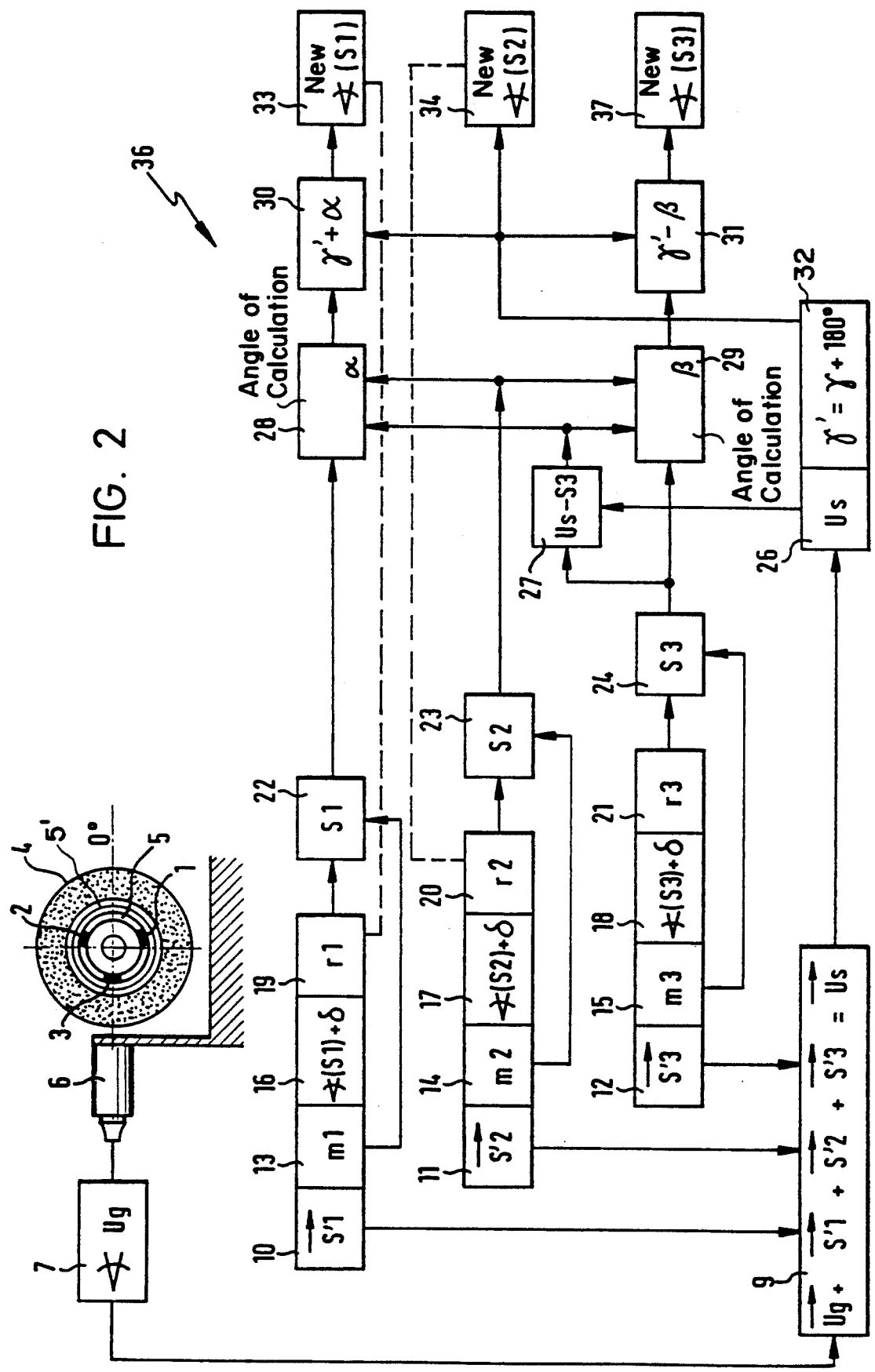
FIG. 2 is a block circuit diagram of a second embodiment of an apparatus according to the invention.

Referring firstly to FIGS. 1 and 2 together, in the embodiments therein measuring operations for ascertaining the unbalance of a grinding wheel 4 are effected by means of a measurement value detector or pick-up 6. The measurement value detector 6 detects oscillations or vibrations generated by the unbalance of the grinding wheel upon rotation thereof, and supplies a corresponding electrical signal to an unbalance measuring device indicated at 7 in both FIGS. 1 and 2, which is set to the speed of rotation of the grinding wheel 4 in the unbalance measuring run. That ensures that only oscillation or vibration components at the frequency of the grinding wheel are detected by the unbalance measuring device 7, for ascertaining therefrom the magnitude and angular position of the unbalance from which the grinding wheel 4 is suffering. The measured unbalance is indicated in both FIGS. 1 and 2 by Ug.

Looking now more specifically at FIG. 1, in the embodiment illustrated therein, first and second balancing weights 1 and 2 in the form of sliding weights are fixed in a guide groove 5 extending around the axis of rotation of the grinding wheel 4, during the unbalance measuring run. The balancing weights 1 and 2 can be moved in the guide groove about the axis of rotation of the grinding wheel 4 on a given radius, to put them into the desired angular positions relative to the grinding wheel 4. A second guide groove 5' is also provided so that the balancing weights may be positioned at variable radii about the axis of rotation of the grinding wheel.

The embodiment shown in FIG. 2 on the other hand has first, second and third balancing weights 1, 2 and 3 which are disposed in the guide groove 5 so that those balancing weights can also be moved into the appropriate angular positions for compensating for unbalance of the balancing wheel.

Referring now again to FIG. 1, the output side of the unbalance measuring device 7 is connected to an evaluation means indicated generally at 35. The evaluation means 35 includes first and second vector storage devices 10 and 11 for the storage of force vectors S'1 and S'2, as shown for example in FIG. 3(A). Those force vectors result from the respective masses of the two balancing weights 1 and 2, their radii on which they are disposed on the grinding wheel 4 about the axis of rotation thereof, and their respective angular position relative to a reference or zero position, indicated at 0° in the Figures. That takes account of the fact that the balancing weights 1, 2 can also be guided on different radii about the axis of rotation of the grinding wheel 4, in suitable guide grooves 5,5', and the balancing weights 1 and 2 may be of different masses. Therefore connected to the vector storage device 10 are further storage devices, more specifically a storage device 13 for storing the mass m1 of the balancing weight 1, a storage device 16 for storing the angular position of the balancing weight 1 and a reference angle δ, and a storage device 19 for storage of the radius r1 on which the balancing weight 1 is movable about the axis of rotation of the grinding wheel 4. In place of the storage devices 13, 16 and 19 the apparatus may also have corresponding input devices for input of the corresponding values into the vector storage device 10. In the same manner, connected to the vector storage device 11 is a mass storage device 14 for storage of the mass m2 of the balanacing weight 2, an angle storage device 17 for storage of the angular position of the balanacing weight 2 and a reference angle δ, and a radius storage device 20 for storage of the radius r2 on which the balancing weight 2 is movable about the axis of rotation of the grinding wheel 4. In this case also, in place of the storage devices 14, 17 and 20, the apparatus may have corresponding input devices for input of the stored parameters into the vector storage device 11.

The vectors S'1 and S'2 which are stored in the two vector storage devices 10 and 11 correspond to unbalance components which are compensated by the balancing weights 1 and 2 on the grinding wheel 4 during rotation of the grinding wheel, in particular during a measuring run. In that situation the balancing weights 1 and 2 generate force vectors S1 and S2. The positions of those vectors are shown more specifically in FIG. 3(A).

The evaluation means 35 also comprises a vector adding device 8 to which the two vector storage devices 10 and 11 are connected. The vector adding device 8 is further connected to the output side of the unbalance measuring device 7. The vectors S'1 and S'2 as well as the measured unbalance vector Ug are supplied to the vector adding device 8 in which those three vectors S'1, S'2 and Ug are added together, with the grinding wheel unbalance vector Us being ascertained in accordance with the following relationship:

$$Us = S'1 + S'2 + Ug.$$

Figure 3A:
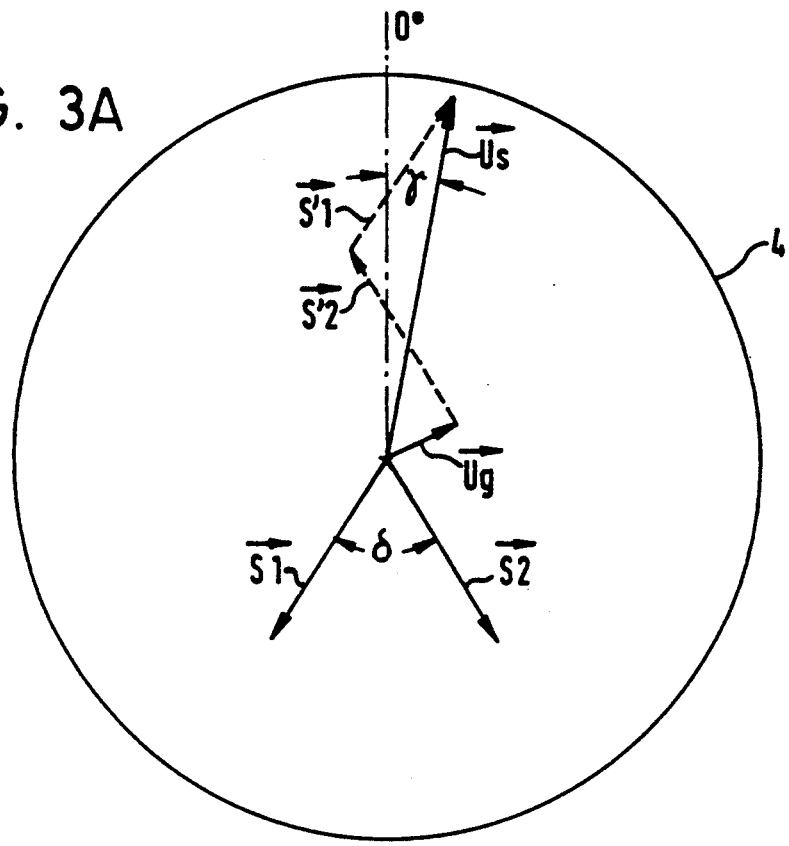
FIGS. 3(A) and 3(B) show vector diagrams for illustrating the mode of operation of the embodiment illustrated in FIG. 1, and FIGS. 4(A) and 4(B) show vector diagrams for illustrating the mode of operation of the embodiment shown in FIG. 2.

The resulting grinding wheel unbalance vector Us is a measurement in respect of the original unbalance which the grinding wheel 4 would have, if the balancing weights 1 and 2 were not present thereon. An output signal which corresponds to that original unbalance and which includes the unbalance value Us and the angular position γ of that unbalance is passed to the output side of the vector adding device 8. The unbalance vector Us for the grinding wheel 4 is also shown in FIG. 3(A) and is in a direction which is at an angle γ with respect to a zero degree position or reference position. That reference position is given on the grinding wheel 4 by the position, turned through 180°, of the line which bisects an angle of spread as indicated at δ in FIG. 3, which is included by the angular positions of the two balancing weights 1 and 2 which remain on the grinding wheel 4 during the unbalance measuring run.

Figure 3B:
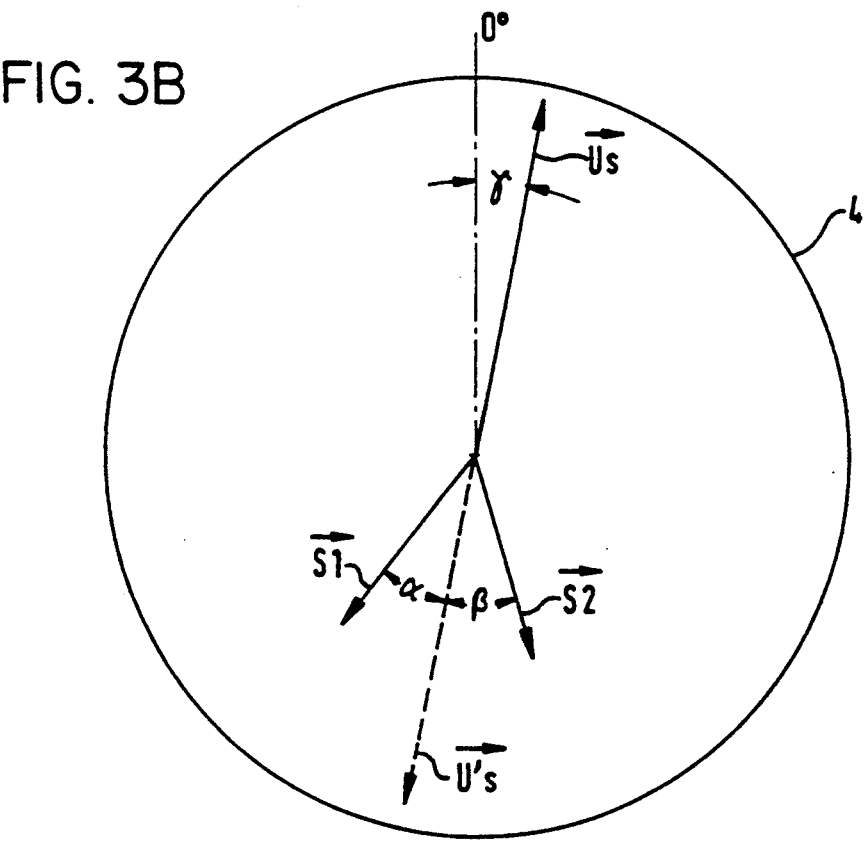

The output signal from the vector adding device 8 is passed to an absolute value calculating device 25 which calculates the scalar value of the unbalance vector Us. The output signal from the vector adding device 8 is also passed to a 180°-circuit 32 for calculating a directional angle (γ+180°) which is turned through 180° relative to the direction of the unbalance vector Us. In order to eliminate the unbalance of the grinding wheel 4, which is given by the unbalance vector Us, it is necessary for the two balancing weights 1 and 2 to produce a resultant force vector which acts in the direction of the angle ($\gamma + 180°$). That force vector is shown in FIG. 3(B) by U's in broken line.

In order to calculate the radii and angular positions on which the two balancing weights 1 and 2 are to be arranged in order to compensate for the unbalance defined by the unbalance vector Us, the evaluation device 35 performs a calculation in respect of the two angles $\alpha$ and $\beta$ which are to constitute the angular positions of the two balancing weights 1 and 2 relative to the direction of the force vector U's. For that purpose, a first cosine forming device 28 and a second cosine forming device 29 are connected in the evaluation device 35 to the two outputs of the absolute value calculating device 25. The value of $\cos \alpha$ is calculated in the cosine forming device 28 and the value of $\cos \beta$ is calculated in the cosine forming device 29. For that purpose the cosine forming device 28 is connected to a scalar calculating device 22 which is connected to the mass storage device 13 for storage of the mass m1 of the balancing weight 1 and the radius storage device 19 for storage of the radius r1 on which the balancing weight 1 is disposed. The scalar calculating device 22 performs calculation of the scalar value S1 in accordance with the following relationship: $S1 = m1 \times r1$.

Likewise the cosine forming device 29 is connected to the scalar calculating device 23 which receives the mass m2 of the balancing weight 2, as stored in the mass storage device 14, and the radius r2 on which the balancing weight 2 is arranged, as stored in the radius storage device 20. The calculating means 23 calculates the scalar value S2 in accordance with the following relationship: $S2 = m2 \times r2$.

The following calculation operation is performed in the cosine forming device 28:

$$\cos\alpha = \frac{Us}{2 \times S1}$$

The following calculation operation is performed in the cosine forming device 29:

$$\cos\beta = \frac{Us}{2 \times S2}$$

At their respective output sides the cosine forming devices 28 and 29 respectively supply output signals which are proportional to the angles $\alpha$ and $\beta$. In the case of the signal in respect of the angle $\alpha$, those output signals are passed to an angle adding device 30 while in the case of the signal in respect of the angle $\beta$, the output signals are passed to an angle subtracting device 31. A further input of the angle adding device 30 is connected to the 180°-circuit 32 and the angle adding device 30 calculates the angular position of the balancing weight 1 relative to the reference or zero position on the grinding wheel 4, by virtue of the angle addition operation $\gamma + 180 + \alpha$.

Furthermore an input of the angle subtracting device 31 is connected to the 180°-circuit 32. To calculate the angular position of the balancing weight 2 relative to the reference or zero position on the grinding wheel 4, the angle subtracting device 31 performs the subtraction operation $(\gamma + 180°) - \beta$.

The angle adding device 30 thus supplies an output signal which corresponds to the angular position in which the balancing weight 1 is to be arranged on the grinding wheel 4, relative to the reference or zero position. That angle value can be displayed in a position display device 33 connected to an output of the angle adding device 30. At the same time, the position display device 33 can possibly also show the radius r1 for the balancing weight 1. For that purpose the position display device 33 may be appropriately connected to the radius storage device 19, as indicated by a broken line in FIG. 1.

A position display device 34 is also connected to the angle subtracting device 31 which thus supplies an output signal corresponding to the angular position in which the balancing weight 2 is to be arranged on the grinding wheel 4, relative to the reference or zero position. That angular position for the balancing weight 2 is then displayed at the position display device 34. The position display device may also be connected to the radius storage device 20, in a similar way to the connection between the position display device 33 and the storage device 19 as described above, in order thereby simultaneously to display the radius r2 at which the balancing weight 2 is to be positioned.

The fresh positioning of the balancing weights 1 and 2 at the specified angular positions and at the specified radii about the axis of rotation of the grinding wheel 4 results in the production of force vectors S1 and S2 which produce a resultant force vector U's which is in opposite relationship to the unbalance vector Us which is to be compensated in respect of the grinding wheel, as shown in FIG. 3(B).

The evaluation means 35 may be of a substantially simpler design configuration if, as actually shown in FIG. 1, the first and second balancing weights 1 and 2 are disposed in the guide groove 5 on the same radius around the axis of rotation of the grinding wheel 4, and if moreover the first and second balancing weights 1 and 2 are of the same mass. In that case the apparatus only requires different input means for input of the position angles or the two illustrated angle storage devices 16 and 17, while it only requires a respective storage device or input means for the mass of the balancing weights and the radius on which the balancing weights are disposed.

Referring now to FIG. 2, the embodiment of the apparatus illustrated therein involves the use of first, second and third balancing weights 1, 2 and 3 for compensating for unbalance of the grinding wheel 4. The balancing weights 1, 2 and 3 are disposed on the illustrated grinding wheel 4 in a single common guide groove 5, in other words the balancing weights are disposed on a common radius about the axis of rotation of the grinding wheel 4. Nonetheless, the apparatus includes an evaluation means as indicated at 36 in FIG. 2, which is so designed that the balancing weights 1, 2 and 3 can be set to different radii about the axis of rotation of the grinding wheel, on same. The evaluation device 36 is also of such a configuration that the balancing weights 1, 2 and 3 may also be of different weights or masses.

It will be seen from FIG. 2 that the basic construction of the evaluation device 36 is the same as the evaluation device 35 shown in FIG. 1. Thus, the evaluation device 36 in FIG. 2 includes first and second vector storage devices 10 and 11 with associated mass storage devices 13 and 14, radius storage devices 19 and 20 and angle storage devices 16 and 17 for the first and second balancing weights 1 and 2, and then in addition a further vector storage device 12 with associated mass storage device 15, associated angle storage device 18 and associated radius storage device 21 for the third balancing weight 3. A scalar calculating means 24 is similarly connected to the mass storage device 15 and the radius storage device 21.

The three vector storage devices 10, 11 and 12 serve for storage of the unbalance component vectors S'1, S'2 and S'3 corresponding to unbalance components which are compensated by the balancing weights 1, 2 and 3 carried on the grinding wheel 4 in the appropriate positions. The vector storage devices 10, 11 and 12 are connected to a common vector adding device 9 to which the unbalance measuring device 7 is also connected, so that the device 7 supplies the vector adding device 9 with the measured unbalance Ug. The vector adding device 9 also serves to calculate the unbalance which the grinding wheel 4 has, without the presence of the balancing weights 1, 2 and 3. The corresponding unbalance vector Us is produced in accordance with the following relationship:

$$Us = S'1 + S'2 + S'3 + Ug.$$

Figure 4A:
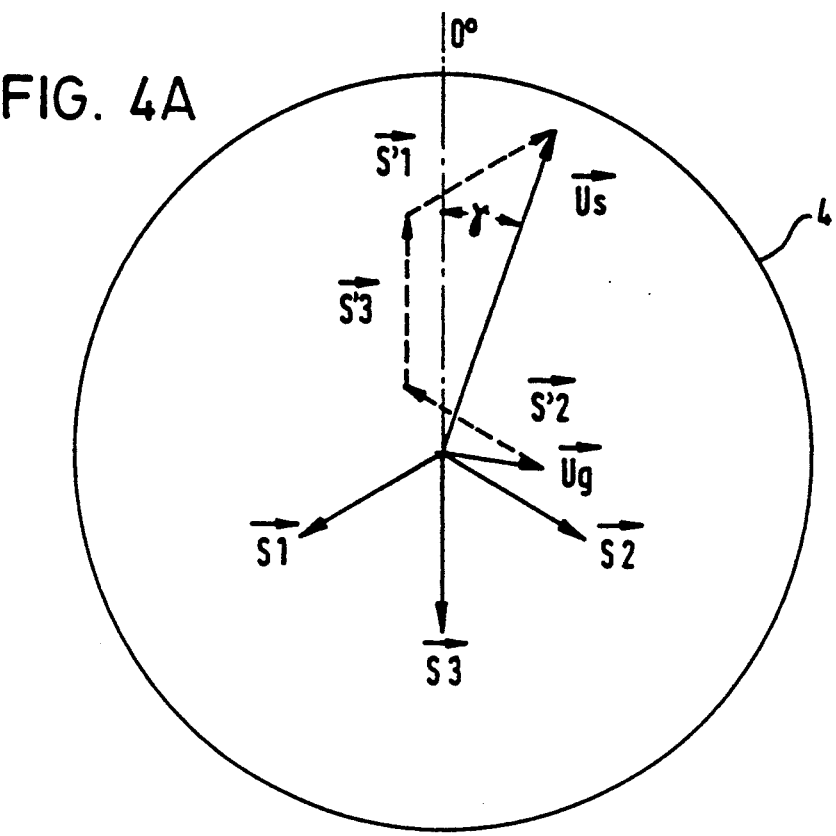
Figure 4B:
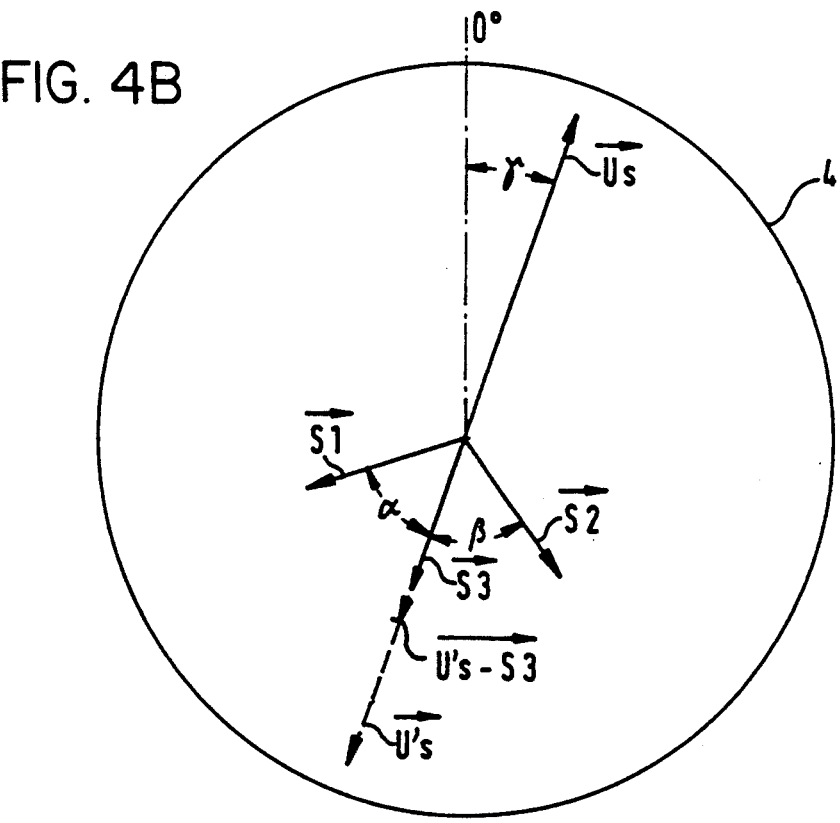

At its output the vector adding device 9 supplies an output signal corresponding to the unbalance vector Us. That output signal is passed to an absolute value calculating device 26 which calculates the scalar value Us of the unbalance vector Us. The output signal of the vector adding device 9 is also passed to a 180°-circuit 32 which turns the directional angle $\gamma$ of the grinding wheel unbalance vector Us through 180°. As in the case of the evaluation device 35, the evaluation device 36 in FIG. 2 also ascertains positioning of the balancing weights 1, 2 and 3 such as to produce a resultant force vector U's which is directed in opposite relationship to the unbalance vector Us of the grinding wheel 4 without the balancing weights thereon, as shown in FIG. 4(B).

For that purpose, a subtracting device 27 is also connected in the evaluation device 36 to the output of the absolute value calculating device 26. The subtracting device 27 is operable to form the scalar difference Us-S3. The value S3 is the scalar value which is obtained from the third balancing weight 3 and which is formed in accordance with the following relationship: $S3 = m3 \times r3$.

The output side of the scalar calculating device 24 is connected to an input side of the subtracting device 27.

The output signal from the subtracting device 27, which corresponds to the difference Us−S3, is passed to the first and second cosine forming devices 28 and 29. The cosine forming device 28 performs the following calculating operation:

$$\cos\alpha = \frac{Us - S3}{2 \times S1}$$

The cosine forming device 29 performs the following calculation:

$$\cos\beta = \frac{Us - S3}{2 \times S2}$$

For that purpose the cosine forming devices 28 and 29 are connected to the respective scalar calculating devices 22, 23 and 24 in a manner which is essentially similar to the configuration adopted in the embodiment shown in FIG. 1. The functions of the angle adding device 30, the 180°-circuit 32 and the angle subtracting device 31 are the same as in the FIG. 1 embodiment so that attention is directed to the description thereof, for the purposes of the present description.

The new angular positions for the balancing weights 1 and 2 are displayed in the position display devices 33 and 34 which are connected to the angle adding device 30 and the 180°-circuit 32. In addition, the position display devices 33 and 34 may also display the radii r1 and r2 at which the balancing weights 1 and 2 are arranged on the grinding wheel 4. That is indicated in FIG. 2 by the broken-line connections between the display devices 33 and 34 and the respective radius storage devices 19 and 20.

The position display device 37 for the new angular position of the balancing weight 37 is connected to the angle subtracting device 31.

In addition, in the embodiment shown in FIG. 2 the third balancing weight 3 is arranged displaced through 180° relative to the direction (directional angle $\gamma$) of the unbalance vector Us. Looking now at FIG. 4(B), the force vectors produced by the balancing weights 1, 2 and 3 which are arranged in the new angular positions on the balancing wheel 4 are identified by S1, S2 and S3. Those force vectors compensate for the unbalance Us of the grinding wheel 4.

The display devices 33 and 34 show the angular positions of the balancing weights 1 and 2 relative to the reference or zero position, with the display device 37 showing the angular position of the third balancing weight. That reference or zero position can be specified for example prior to beginning a measuring run, by means of a marking on the grinding wheel.

It will be noted that, in the embodiments illustrated in FIGS. 1 and 2, fresh positioning of the balancing weights may be effected by manual displacement thereof. It is also possible however to provide for displacement of the balancing weights into the appropriate positions by means of an automatic assembly which is not illustrated herein. The automatic assembly is then actuated by the output signals from the angle adding device 30 and the angle subtracting device 31.

As in the case of the FIG. 1 embodiment, a preferred embodiment of the arrangement shown in FIG. 2 provides that the balancing weights 1, 2 and 3 are of the same mass and in addition the three balancing weights 1, 2 and 3 are arranged on the same radius around the axis of rotation of the grinding wheel 4.

The evaluation devices 35 and 36 shown in FIGS. 1 and 2 respectively may be of analog or digital type, with the latter being preferred. For that purpose, if the output signal of the unbalance measuring device 7 is in analog form, an analog-digital converter may be disposed on the input side of the respective evaluation device 35 or 36.

The unbalance measuring procedure and the balancing operation are preferably carried out in a balancing machine, but it is also possible for those operations to be carried out on a grinding wheel when fitted in a grinding machine.

It will be appreciated that the above-described apparatuses and method of grinding wheel balancing have been set forth solely by way of example and illustration of the principles of the present invention, and that various modifications and alterations may be made therein without thereby departing from the spirit and scope of the invention.

We claim:

1. A method of balancing a grinding wheel comprising the steps of:
    performing an unbalance measuring operation to determine the unbalanced nature of the grinding wheel;
    securing at least two balancing weights to the grinding wheel along at least one radius around the axis of the grinding wheel in balancing positions calculated from the measuring operation;
    locating and storing positions of said at least two weights;
    determining proper balancing positions of said at least two weights to balance the grinding wheel by effectively removing said at least two weights without actual physical movement of said at least two balancing weights; and
    repositioning said at least two weights to said proper balancing positions to balance the grinding wheel, wherein the step of determining proper positions of said at least two balancing weights includes vectorially adding unbalance vectors associated with force vectors resulting from the stored positions and respective masses of said at least two balancing weights together with a measured unbalance vector, thereby determining a grinding wheel unbalance vector and thereafter, repositioning said at least two balancing weights on the grinding wheel to compensate the grinding wheel unbalance vector, and wherein first and second balancing weights are utilized and each said balancing weight is arranged at a respective angle ($\alpha$ and $\beta$ respectively) with respect to the angular position which is turned through 180° of the grinding wheel unbalance vector, the angles in the case of equal balancing weights satisfying the following equations:

$$\cos\alpha = \frac{U_s}{2 \times S1}$$

and $$\cos\beta = \frac{U_s}{2 \times S2}$$

and in the case of different balancing weights satisfying the following equations:

$$\cos\beta = \frac{U_s^2 + S_1^2 - S_2^2}{2 \cdot U_s \cdot S_1}$$

and $$\sin\alpha = \frac{S_1}{S_2} \cdot \sin\beta$$

wherein Us designates the magnitude of the grinding wheel unbalance vector, S1 designates a scalar value which results from a mass of the one balancing weight and a radius at which that weight is movable around the axis of rotation of the grinding wheel, and S2 designates a scalar value which results from a mass of the other balancing weight and a radius at which that weight is movable around the axis of rotation of the grinding wheel.

2. A method as set forth in claim 1, wherein said at least two balancing weights are movable on constant radii about the axis of rotation of the grinding wheel.

3. A method as set forth in claim 1, wherein said at least two balancing weights are movable on a common radius about the axis of rotation of the grinding wheel.

4. A method as set forth in claim 1, wherein said at least two balancing weights are of the same mass.

5. A method of balancing a grinding wheel comprising the steps of:
    performing an unbalance measuring operation to determine the unbalanced nature of the grinding wheel;
    securing at least two balancing weights to the grinding wheel along at least one radius around the axis of the grinding wheel in balancing positions calculated from the measuring operation;
    locating and storing positions of said at least two weights;
    determining proper balancing positions of said at least two weights to balance the grinding wheel by effectively removing said at least two weights without actual physical movement of said at least two balancing weights; and
    repositioning said at least two weights to said proper balancing positions to balance the grinding wheel, wherein the step of determining proper positions of said at least two balancing weights includes vectorially adding unbalance vectors associated with force vectors resulting from the stored positions and respective masses of said at least two balancing weights together with a measured unbalance vector, thereby determining a grinding wheel unbalance vector and thereafter, repositioning said at least two balancing weights on the grinding wheel to compensate the grinding wheel unbalance vector, and wherein first, second and third balancing weights are utilized and one said balancing weight is arranged at an angular position which is turned through 180° relative to the angular position of the grinding wheel unbalance vector and the other two balancing weights are arranged at respective angular positions ($\alpha$ and $\beta$ respectively) related to the angular position of said vector turned through 180°, said angular positions in the case of equal balancing weights satisfying the following equations:

$$\cos\alpha = \frac{U_s - S3}{2 \times S1}$$

and $$\cos\beta = \frac{U_s - S3}{2 \times S2}$$

and in the case of different balancing weights satisfying the following equations:

$$\cos\beta = \frac{(U_s - S_2)^2 + S_1^2 - S_3^2}{2 \cdot (U_s - S_2)^2 \cdot S_1}$$

and $$\sin\alpha = \frac{S_1}{S_3} \cdot \sin\beta$$

wherein, Us designates the magnitude of the grinding wheel unbalance vector and S1, S2 and S3 respectively designate scalar values which result from respective masses of the first, second and third balancing weights and respective radii at which the balancing weights are movable around the axis of rotation of the grinding wheel.

6. A method as set forth in claim 5, wherein said at least two balancing weights are movable on constant radii about the axis of rotation of the grinding wheel.

7. A method as set forth in claim 5, wherein said at least two balancing weights are movable on a common radius about the axis of rotation of the grinding wheel.

8. A method as set forth in claim 5, wherein said at least two balancing weights are of the same mass.

9. A method of balancing a grinding wheel comprising the steps of:
  performing an unbalance measuring operation to determine the unbalanced nature of the grinding wheel;
  securing at least two balancing weights to the grinding wheel along at least one radius around the axis of the grinding wheel in balancing positions calculated from the measuring operation;
  locating and storing positions of said at least two weights;
  determining proper balancing positions of said at least two weights to balance the grinding wheel by effectively removing said at least two weights without actual physical movement of said at least two balancing weights; and
  repositioning said at least two weights to said proper balancing positions to balance the grinding wheel, wherein said at least two balancing weights are movable on variable radii about the axis of rotation of the grinding wheel.

10. A method as set forth in claim 9, wherein said at least two balancing weights are movable on constant radii about the axis of rotation of the grinding wheel.

11. A method as set forth in claim 9, wherein said at least two balancing weights are movable on a common radius about the axis of rotation of the grinding wheel.

12. A method as set forth in claim 9, wherein said at least two balancing weights are of the same mass.

13. Apparatus for balancing a grinding wheel by means of first and second balancing weights adapted to be guided on and secured to the grinding wheel comprising: a measurement value detector means; an unbalance measuring means connected thereto; an evaluation means adapted to determine the positioning of said balancing weights in dependence on the measured unbalance of the grinding wheel; operatively associated with each balancing weight a respective vector storage means for storing in dependence on the mass and positioning of the respective balancing weight on the grinding wheel an unbalance vector which is compensated thereby; a vector adding means connected to the first and second vector storage means and to the output of the unbalance measuring means; a 180°-circuit connected to the output of the vector adding means and operable to turn through 180° the direction of the vector formed by the vector adding means and to supply a corresponding angle signal, the 180°-circuit including a first and a second output; an angle adding means having a first input connected to the first output of the 180°-circuit and a second input; a first angle calculating means connected to the second input of the angle adding means to supply same with a signal corresponding to the angle of the first balancing weight, wherein the first angle calculating means is operable to calculate said angle of said first weight from the absolute value of the output signal supplied by the vector adding means and a scalar value formed from the mass of said first balancing weight and the radius at which said weight is guided on the grinding wheel around the axis of rotation of the grinding wheel; an angle subtracting means having a first input connected to the second output of the 180°-circuit and a second input; and a second angle calculating means connected to the second input of the angle subtracting means to supply the same with a signal corresponding to the angle of the second balancing weight, wherein the second angle calculating means is operable to calculate said angle of said second weight from the absolute value of the output signal supplied by the vector adding means and a scalar value formed from the mass of the second balancing weight and the radius at which said second weight is guided on the grinding wheel around the axis of rotation of the grinding wheel.

14. Apparatus for balancing a grinding wheel installed in a grinding machine by means of first, second and third balancing weights which are adapted to be guided on and secured to the grinding wheel comprising: a measurement value detector means; an unbalance measuring means connected thereto; an evaluation means for determining the balancing weights in dependence on the measured unbalance; operatively associated with the three balancing weights respective vector storage means for storing in dependence on the mass and positioning of the respective balancing weight on the grinding wheel an unbalance vector which is compensated thereby; a vector adding means connected to the first, second and third vector storage means and to the output of the unbalance measuring means; a 180°-circuit connected to the output of the vector adding means and operable to turn through 180° the direction of the vector formed by the vector adding means and to supply a corresponding angle signal representing a first angular position for positioning of one of the balancing weights, the 180°-circuit including first and second outputs; an absolute value calculating means connected to the output of the vector adding means for forming the scalar value of the vector supplied by the vector adding means; a subtracting means connected to the output of the absolute value calculating means for calculating the difference of the scalar value of the vector supplied by the vector adding means and a scalar value formed from the mass of the weight to be arranged at said first angular position and the radius at which said balancing weight is guided on the grinding wheel around the axis of rotation thereof; an angle adding means having a first input connected to the first output of the 180°-circuit and a second input; a first angle calculating means connected to the subtracting means and the second input of the angle adding means to supply same with a first angle signal corresponding to a first cosine value formed, said first angle signal being calculated from scalar values supplied to the first angle calculating means and which are formed from the masses of the two balancing weights and the radii at which said balancing weights are guided around the axis of rotation of the grinding wheel; an angle subtracting means having a first input connected to the second output of the 180°-circuit and a second input; and a second angle calculating means connected to the subtracting means and the second input of the angle subtracting means to supply the same with a second angle signal corresponding to a second cosine angle formed, said second angle signal being calculated from a scalar value supplied to the second angle calculating means and which is formed from the mass of the other of the two remaining balancing weights and the radius at which said balancing weight is guided around the axis of rotation of the grinding wheel.

* * * * *